UNITED STATES PATENT OFFICE.

ALBERT MINK, OF NEWARK, NEW JERSEY, ASSIGNOR TO CHRISTIAN F. MUELLER, OF SAME PLACE.

WATERPROOFING COMPOSITION.

SPECIFICATION forming part of Letters Patent No. 295,881, dated March 25, 1884.

Application filed July 23, 1883. (No specimens.)

*To all whom it may concern:*

Be it known that I, ALBERT MINK, a citizen of the United States, residing in Newark, Essex county, New Jersey, have invented certain new and useful Improvements in Waterproofing Compositions, fully described in the following specification.

This composition consists in a mixture of tallow, rosin, creosote, extract of rape-seed, and ammonia, prepared in the manner herein described, and is used for application to paper and other fabrics while heated. The rosin I use is that remaining from the distillation of turpentine, and the variety I prefer is light in color and brittle in texture.

To prepare the composition, I employ about twenty pounds of tallow, one hundred pounds of the rosin, two ounces of creosote, two ounces of ground rape-seed, and two ounces of ammonia. The rape-seed is boiled in water until the juices are extracted, forming about seven fluid ounces of liquid. The tallow is then melted in a suitable boiler, the rosin put in and melted, and the other three ingredients are then added and the whole is boiled together. The composition is then applied to the fabric as hot as possible, for the reason that it assumes a consistency like india-rubber gum when cold.

I have hitherto applied the mixture to the fabric by means of a pair of rollers, which serve both to distribute the fluid and to press off the superfluity, leaving an even coating upon the goods, which are ready for use when cold and dried by the evaporation of the more volatile elements, as water and ammonia. The application of a very thin coat to one side of porous paper suffices to saturate it and render it wholly water-proof.

The proportions of my composition may be slightly varied without greatly affecting its efficiency; and I therefore claim as my invention—

The waterproofing composition formed of tallow, rosin, creosote, rape-seed, and ammonia, combined substantially in the manner and proportions herein specified.

In testimony whereof I have hereunto set my hand in the presence of two subscribing witnesses.

ALBERT MINK.

Witnesses:
 THOS. S. CRANE,
 HENRY THEBERATH.